United States Patent [19]
Falk et al.

[11] 4,414,342
[45] Nov. 8, 1983

[54] GLASS-FILLED THERMOPLASTIC RESINS

[75] Inventors: John C. Falk, Chicago; Klementina F. Khait, Skokie, both of Ill.

[73] Assignee: Borg-Warner Corporation, Chicago, Ill.

[21] Appl. No.: 328,159

[22] Filed: Dec. 7, 1981

[51] Int. Cl.$^3$ .................. C08K 3/40; C08L 33/26; C08L 63/08

[52] U.S. Cl. .................. 523/437; 523/467; 524/517; 524/521; 524/522

[58] Field of Search ............ 523/467; 524/422, 517, 524/521, 522; 532/437

[56] References Cited

U.S. PATENT DOCUMENTS

| | | |
|---|---|---|
| 3,414,432 | 12/1968 | Mertzweiler et al. |
| 3,619,229 | 11/1971 | Hartlein ........................ 523/467 |
| 3,804,919 | 4/1974 | Schrage et al. |
| 3,915,929 | 10/1975 | Kishikawa et al. ............ 523/467 |
| 3,940,537 | 2/1976 | Burns. |

FOREIGN PATENT DOCUMENTS

| | | |
|---|---|---|
| 49-35333 | 9/1974 | Japan ........................ 524/522 |
| 54-23656 | of 1979 | Japan. |

*Primary Examiner*—Allan Lieberman
*Attorney, Agent, or Firm*—Richard J. Schlott

[57] ABSTRACT

Glass fiber reinforced thermoplastic resins composing glass fiber, a thermoplastic resin and a copolymer of an ethylenically-unsaturated monomer and from about 1 to about 20 wt. % of copolymerizable functional monomer exhibit a marked improvement in impact properties, heat distortion values and ductility, and improved adhesion between matrix resin and fiber.

8 Claims, No Drawings

GLASS-FILLED THERMOPLASTIC RESINS

BACKGROUND OF THE INVENTION

This invention relates to improved glass fiber reinforced thermoplastic resins and more particularly to improved compositions comprising glass fiber, a thermoplastic resin and a copolymer of at least one ethylenically-unsaturated monomer and a copolymerizable functional monomer and to a method for enhancing the impact properties of glass fiber reinforced thermoplastic resins.

Glass fiber reinforcement is added to a variety of plastic matricies to improve the strength, dimensional stability and heat resistance of the composite. The addition of reinforcing fibers in the form of chopped or milled glass strand to thermoplastic molding resins enhances stiffness, reduces creep and improves overall dimensional stability of molded parts, particularly at elevated temperatures. To be effective in molding resins the glass fiber surfaces normally must be treated with a coupling agent to improve adhesion between the fiber and the matrix resin, and a wide variety of silane compounds have been developed for this purpose. Glass fibers treated with appropriate coupling agents have been employed to reinforce a wide variety of thermoplastics including polyamide (nylon) and polypropylene. Where the matrix resin is crystalline as in nylon, for example, marked increases in flexural strength, rigidity and impact resistance are noted. However, in rigid amorphous molding resins such as polystyrene and styrene-acrylonitrile copolymers which are generally more brittle in character, the addition of chopped or milled glass fiber normally results only in an increase in rigidity, flexural modulus and tensile strength without improving the generally low impact strength of the matrix resin. These glass filled composites are thus more brittle and less ductile than the corresponding unfilled counterparts. An improved method for reinforcing such brittle amorphous resins which would result in both improved dimensional stability and increased impact strength and ductility would thus be a useful advance in the art.

SUMMARY OF THE INVENTION

The instant invention is an improved composition comprising glass fiber, a thermoplastic resin and a copolymer of an ethylenically-unsaturated monomer and a copolymerizable functional monomer and a method for improving the impact properties of glass reinforced thermoplastic resins.

DETAILED DESCRIPTION OF THE INVENTION

The glass reinforced thermoplastic resin compositions which are improved by the practice of this invention comprise from 5 to 50 wt. % glass fiber and from 95 to 50 wt. % of a rigid thermoplastic resin. The rigid thermoplastic resin may be any of the widely known rigid amorphous thermoplastic molding resins. More particularly, the thermoplastic resins useful for the purposes of this invention are glass filled monovinylidene resins and may be selected from the group consisting of styrenic resins and acrylic resins including for example polystyrene, polymethyl-methacrylate styrene-acrylonitrile copolymer resins, copolymers of styrene, alphamethylstyrene and acrylonitrile, styrene-methylmethacrylate copolymers, styrene-maleic anhydride copolymers and the like. Also useful are high impact, rubber-modified graft and blend polymer analogs of these resins including rubber-modified high impact polystyrenes (HIPS) and rubber modified styrene-acrylonitrile graft copolymers such as the ABS and ASA resins. The compositions may further include other compatible resins known in the resin molding art as exemplified by blends of polyphenylene oxide with high impact styrene. These thermoplastic resins are well known and widely available in both glass filled and unfilled form and the preparation thereof does not form a part of this invention.

The compositions of this invention further comprise a copolymer of an ethylenically-unsaturated monomer and a copolymerizable functional monomer. More particularly, the copolymer is formed of a monovinylidene monomer selected from the group consisting of monovinyl aromatic compounds such as styrene, alpha methylstyrene, vinyl toluene and the like, acrylic compounds such as a lower alkyl acrylate, acrylonitrile, acrylamide and the like, methacrylic compounds such as alkyl methacrylates, methacrylamide and methacrylonitrile, as well as mixtures and combinations thereof, and a copolymerizable functional monomer defined as a monoethylenically unsaturated monomer containing at least one reactive functional radical. The functional radical may be selected from the group consisting of epoxy radicals, and carbonyl radicals such as carboxylic acid radicals, carboxylic anhydride radicals, amide radicals, N-alkoxyalkyl amide radicals and the like. Examples of such functional monomers include acrylic acid, maleic anhydride, glycidyl methacrylate, N-methylolacrylamide and N-butoxymethylacrylamide. The copolymers useful for the purposes of this invention may be readily prepared by any of a variety of free radical processes including emulsion, suspension and bulk polymerization processes. The amount of functional monomer employed in preparing the copolymer will vary according to the particular end use envisioned, however in general the polymer will consist of from about 1 to about 20 wt. %, based on final copolymer, of functional monomer units and correspondingly from about 99 to about 80 wt. % of ethylenically-unsaturated monomer units.

The copolymer is employed in blends with the glass filled thermoplastic resin to enhance the impact properties of the glass fiber reinforced resin.

The blends may be formed by any of the methods commonly employed in the compounding art for producing glass filled resins including dry blending, melt mixing, extrusion coating of continuous fiber and the like. Alternatively, one or more of the resin components may be used in latex form to coat the fiber to produce resin coated fiber for use in preparing glass filled composites. Proper selection of the particular compounding process for making blends for specific end uses will be readily apparent to those skilled in the compounding art. The amount of copolymer employed will depend in part upon the level of functional radical containing monomer units present in the copolymer, in that copolymers containing higher levels of functional radical monomer units will be effective even when blended with the glass filled thermoplastic resin at low levels. However, the levels which produce effective impact improvement will be from about 1 wt. % to about 20 wt. % of the final composition.

The practice of this invention will be better understood by consideration of the following Examples which illustrate the preparation of the copolymer and the use thereof in glass reinforced thermoplastic compositions.

EXAMPLE 1

Preparation of the Copolymer

A polymerization kettle was charged with 81 g. of deionized water, 0.06 g. of sodium dodecylbenzene sulfonate (23%) surfactant and 0.23 g. of sodium carbonate. The charge was blanketed with nitrogen, stirred and heated to 65° C. A monomer emulsion containing 81 g. of deionized water, 62.7 g. of styrene, 27.3 g. of acrylonitrile, 10.0 g. of N-isobutoxymethylacrylamide and 1.92 g. of the dioctyl ester of sodium sulfosuccinic acid was prepared by stirring the surfactant into the water, then adding the monomers slowly and with strong stirring. An initial charge of 2.11 g. of the monomer emulsion was added to the kettle followed by a solution of 0.35 g. of sodium persulfate in 3.85 g of water as the initiator. The stirred mixture was heated at 65° C. for 20 min., then 0.5 g. of t-dodecyl mercaptan (molecular weight regulator) were added. The remaining monomer emulsion was then continuously added to the kettle over a three hour period while maintaining the nitrogen blanket and continually heating and stirring the mixture at 65° C. At the end of the addition of the monomer emulsion, the mixture was heated at 65° C. for an additional hour to complete the polymerization. After cooling, the polymer was collected by coagulation in three volumes of aqueous aluminum sulfate at 140° F., filtering and washing the coagulated resin with water to remove surfactant. The resin, amounting to 98 g. after drying, was a copolymer containing 62.7% wt. % styrene units, 27.3 wt. % acrylonitrile units and 10 wt. % N-isobutoxymethyl acrylamide units.

EXAMPLE 2

Blends of Glass Fiber, Thermoplastic Resin and Functional Copolymer

A blend consisting of 65 g. of granulated styrene-acrylonitrile resin, obtained from Dow as Tyril 860, 20 g. of ¼" chopped glass fiber, obtained from Owens Corning as 885 EB, and 15 g. of powdered functional copolymer (see Example 1) was prepared by dry-mixing the powdered resins and glass fiber. The mixture was injection molded to provide test specimens. The test specimen exhibited a room temperature Izod impact of 2.3 ft. lbs./in. notch and a heat deflection temperature (10 mil) of 219° F.

An injection molded control blend containing no functional copolymer, prepared from 80 g. of granulated styrene-acrylonitrile resin and 20 g. of chopped ¼" glass fiber, had an Izod impact of 1.0 ft. lbs./in. notch and a heat deflection temperature (10 mil) of 212° F.

It will thus be apparent from these data that the incorporation of 15 wt. % of functional copolymer into a glass-filled styrene-acrylonitrile resin provides a substantial improvement in impact properties and heat deflection temperature.

EXAMPLES 3–10

In the following Examples, summarized in Table 1, functional copolymers containing from 2 to 10 wt. % N-isobutoxymethyl acrylamide (IBMA) functional monomer units and correspondingly from 98 to 90 wt. % styrene and acrylonitrile monomer units in a 2.3:1 ratio were prepared substantially by the process of Example 1, then blended with styrene-acrylonitrile resin (Tyril 860) and ¼" chopped glass fiber (885EB) by milling on a two roll mill at 420° F. for 5 min. The blend was sheeted-out, cooled and then compression molded at 365° F. for 6 min. to form test specimens. The physical property data for the blends is reflected in Table I.

Control blends were prepared by milling and molding as for the specimens of Examples 3–10.

TABLE I

| | SAN/Glass Fiber/Functional Copolymer Blend* | | | | | | | | | |
|---|---|---|---|---|---|---|---|---|---|---|
| | Blend, Wt. % | | | IBMA[1] | Izod[2] | | | | Flex[2] | Flex[2] |
| Ex. No. | SAN | Glass Fiber | Functional Copolymer | (in f.c.) wt. % | Impact ft.lb./in. | HDT[2] °C. | U[2] Kpsi | E[2] % | Mod. Kpsi | Str. Kpsi |
| 3 | 65 | 20 | 15 | 2 | 4.8 | 101 | — | — | — | — |
| 4 | 65 | 20 | 15 | 5 | 3.1 | 102 | 8.2 | 5 | 912 | 16.2 |
| 5 | 65 | 20 | 15 | 10 | 6.2 | 105 | 7.2 | 3 | 752 | 15.9 |
| 6 | 50 | 20 | 30 | 10 | 7.1 | 102 | 8.0 | 3 | 772 | 18.5 |
| 7 | 55 | 30 | 15 | 10 | 5.9 | 104 | 9.3 | 4 | 1,141 | 15.3 |
| 8 | 40 | 30 | 30 | 10 | 7.5 | 104 | 9.7 | 4 | 790 | 20.3 |
| 9 | 45 | 40 | 15 | 10 | 12.0 | 104 | 12.7 | 4 | 1,141 | 27.5 |
| 10 | 30 | 40 | 30 | 10 | 10.1 | 107 | 10.9 | 4 | 1,138 | 27.4 |
| Control A | 100 | — | — | — | 0.3 | 97 | — | — | — | — |
| Control B | 85 | — | 15 | 10 | 0.2 | 88 | — | — | — | — |
| Control C | 80 | 20 | — | — | 0.9 | 99 | 11.1 | 3 | 998 | 12.3 |

Notes:
[1]IBMA = N—isobutoxymethyl acrylamide; see Example 1 for preparation of functional copolymer (f.c.).
[2]Room temperature test data. HDT = 264 psi, 10 mil heat deflection temperature; Izod impact for notched ⅛" bars.
*Samples are compression molded It will be apparent from the physical property data presented in Table I that SAN is a brittle, low impact resin which is not substantially improved by the addition of either glass fiber or functional copolymer alone, as shown by the data for Control Blends A–C. The combination of SAN, a functional copolymer containing as little as 2 wt. % IBMA functional monomer units and glass fiber results in a composition exhibiting a marked improvement in impact properties (Compare Example 3 with Controls B and C). Further increases in the IBMA content of the functional copolymer, Examples 4 and 5, impart additional increases in impact and heat deflection temperature values for compositions comprising a single level (15 wt. %) of functional copolymer. For compositions containing a single level of glass, an increase in the amount of functional copolymer generally results in improved impact and/or heat deflection properties (compare Example 5 with 6, Example 7 with 8 and Example 9 with 10) without markedly affecting the rigidity of the blends. The level of glass fiber in SAN compositions may thus be increased to produce increasingly rigid composites while maintaining desirable impact and heat deflection values (Compare Examples 5, 7 and 9 and Examples 6, 8 and 10).

EXAMPLES 11-14

In the following Examples, summarized in Table II, blends containing various levels of SAN, ¼" chopped glass fiber and SAN-IBMA functional copolymer were prepared by dry-mixing the components in a PK blender for five minutes and then injection molding the powdered mixture on a 1 oz. Battenfeld screw injection molding machine having a 2.5:1 compression ratio, at a stock temperature of 430° F., and at minimum back pressure (0–50 psi) to provide test specimens.

characteristic of SAN-glass fiber composites (compare Examples 12 and 14 with Examples 11, 13 and Control D).

EXAMPLES 15-30

The use of functional copolymers improves the properties of glass fiber reinforced thermoplastic resins other than SAN. In the following Examples, set forth in Table III, a variety of glass fiber reinforced thermoplastic resins were compounded with functional copolymers by milling and compression molding the blends substantially as described for Examples 3-10.

The functional copolymers employed in these Examples were prepared as in Example 1, but employing the indicated ethylenically-unsaturated monomer and func-

TABLE II

| | SAN/Glass Fiber/Functional Copolymer Blends* | | | | | | | | | |
|---|---|---|---|---|---|---|---|---|---|---|
| | Blend, Wt. % | | | IBMA$^{(1)}$ | Izod$^{(2)}$ | | | | Flex$^{(2)}$ | Flex$^{(2)}$ |
| Ex. No. | SAN | Glass Fiber | Functional Copolymer | (in f.c.) wt. % | Impact ft.lb./in. | HDT$^{(2)}$ °C. | U$^{(2)}$ Kpsi | E$^{(2)}$ % | Mod. Kpsi | Str. Kpsi |
| 11 | 85 | 0 | 15 | 5 | 0.2 | 98 | 7.4 | 3 | 573 | 14.5 |
| 12 | 65 | 20 | 15 | 5 | 3.9 | 102 | 12.3 | 5 | 969 | 21.0 |
| 13 | 85 | 0 | 15 | 10 | 0.2 | 96 | 7.0 | 3 | 548 | 13.9 |
| 14 | 65 | 20 | 15 | 10 | 3.1 | 102 | 12.0 | 4 | 998 | 20.7 |
| Control A | 100 | 0 | 0 | — | 0.1 | 97 | 9.3 | 3 | 552 | 16.1 |
| Control D | 80 | 20 | 0 | — | 0.9 | 99 | 11.1 | 3 | 998 | 19.9 |

Notes:
$^{(1)}$Wt. % IBMA in functional copolymer; See Example 1.
$^{(2)}$See Table I.
*Samples are injection molded.

The property data for the injection molded compositional monomers.

TABLE III

| | Thermoplastic Resin/Glass Fiber/Functional Copolymer Blends | | | | | | | | | |
|---|---|---|---|---|---|---|---|---|---|---|
| | Resin | | Blend, Wt. % | | Functional | Izod$^{(3)}$ | | | | Flex$^{(3)}$ | Flex$^{(3)}$ |
| Ex. No. | Type | Wt. % | Glass Fiber | Functional Copolymer | Copolymer$^{(2)}$ Type | Impact ft.lb./in. | HDT$^{(3)}$ °C. | U$^{(3)}$ Kpsi | E$^{(3)}$ % | Mod. Kpsi | Str. Kpsi |
| 15 | pStyrene | 80 | 20 | 0 | — | 2.1 | 88 | 3.3 | 1 | 646 | 10.3 |
| 16 | pStyrene | 65 | 20 | 15 | S-GMA | 3.8 | 78 | 5.5 | 2 | 766 | 14.1 |
| 17 | pStyrene | 65 | 20 | 15 | S-IBMA | 3.5 | 71 | 5.8 | 3 | 728 | 12.3 |
| 18 | HIPS | 80 | 20 | 0 | — | 5.5 | 92 | 4.5 | 3 | 608 | 12.1 |
| 19 | HIPS | 65 | 20 | 15 | SAN-IBMA | 8.5 | 97 | 6.5 | 3 | 712 | 16.4 |
| 20 | HIPS | 65 | 20 | 15 | SAN-MA | 8.5 | 94 | 6.1 | — | 747 | 13.5 |
| 21 | S-MA | 65 | 20 | 15 | — | 5.5 | 92 | 7.1 | 4 | 723 | 12.4 |
| 22 | S-MA | 65 | 20 | 15 | SAN-IBMA | 5.6 | 114 | 6.2 | 3 | 701 | 14.0 |
| 23 | AMSAN | 80 | 20 | 0 | — | 0.9 | 112 | — | — | — | — |
| 24 | AMSAN | 65 | 20 | 15 | SAN-IBMA | 1.3 | 115 | — | — | — | — |
| 25 | AMSAN | 65 | 20 | 15 | AMSAN-IBMA | 2.4 | 118 | — | — | — | — |
| 26 | SAN | 65 | 20 | 15 | SAN-GMA | 5.7 | 101 | 10.5 | 5 | 776 | 18.2 |
| 27 | PMMA | 65 | 20 | 0 | — | 0.6 | 90 | 5.7 | 3 | 711 | 13.2 |
| 28 | PMMA | 65 | 20 | 15 | SAN-IBMA | 0.8 | 94 | 5.8 | 3 | 717 | 12.6 |
| 29 | MPPO | 80 | 20 | 0 | — | 1.2 | 84 | 6.5 | 5 | 524 | 13.2 |
| 30 | MPPO | 65 | 20 | 15 | SAN-IBMA | 0.8 | 98 | 7.0 | 6 | 698 | 16.3 |

Notes:
$^{(1)}$pStyrene = polystyrene; HIPS = 10% rubber-modified high impact polystyrene; S-MA = styrene-maleic anhydride copolymer; AMSAN = alpha methylstyrene-acrylonitrile copolymer; PMMA = poly-methylmethacrylate; MPPO = blend of HIPS and polyphenylene oxide.
$^{(2)}$GMA = glycidyl methacrylate; IBMA = isobutoxymethylacrylamide; MA = maleic anhydride.
$^{(3)}$See Note 2, Table 1.

tions summarized in Table II more clearly demonstrate the enhancement of properties produced by incorporating the functional copolymer into glass fiber reinforced SAN blends. The addition of ¼" chopped glass fiber alone to the SAN resin of Control A results in a very rigid but quite brittle composite (Control B). The combination of SAN-IBMA functional copolymer alone with an SAN resin lowers the heat deflection temperature values for SAN resin without improving other properties (compare Examples 11 and 13 with Control A). Combinations comprising SAN, glass fiber and functional copolymer exhibit a marked and desirable enhancement of impact properties, heat distortion values and ductility (E) while maintaining the rigidity The addition of functional copolymers to a variety of glass fiber reinforced thermoplastic monovinylidene resins enhances the impact, ductility and heat distortion temperature properties of the composites, as shown by the Examples in Table III. Glass fiber filled polystyrene, Example 15, is a brittle composite without the incorporation of styrene-IBMA or styrene-glycidyl methacrylate copolymer, as shown by the compositions of Examples 16 and 17. Surprisingly, even though styrene-maleic anhydride copolymer is a functional copolymer, a composition comprising styrene-maleic anhydride copolymer (S-MA) and glass fiber (Example 21), exhibits further property enhancement with the addition of a styrene-acrylonitrile-IBMA functional copolymer. The principle is readily extended to other glass fiber reinforced resins including high impact polystyrene, Examples 18–20, alpha methylstyrene-acrylonitrile high heat resins, Examples 23–25, polymethyl methylmethacrylate, Examples 27–28 and to HIPS - polyphenylene ether blends, Examples 29–30.

As is well known in the processing art, the physical properties and particularly the impact properties of thermoplastic resins may vary over a wide range depending upon the compounding conditions employed. For example, as will be seen from an examination of the data for the compression molded composition of example 5 (Table I) and the injection molded composition of Example 14 (Table II), many of the physical property values of otherwise identical compositions depend upon the method used for their processing. In processing glass-filled thermoplastic resins, conditions which affect the uniformity of fiber dispersion in the matrix resin are also known to markedly change the impact properties of molded articles, as does processing which increases the amount of fiber breakage. In general, it has been thought that good fiber dispersion is necessary to attaining good reinforcement, while fiber breakage is thought to reduce impact properties.

Glass fiber used for reinforcing thermoplastics is usually obtained by chopping or milling fiber glass strand to produce discrete fiber bundles of substantially uniform length and made up of many individual glass fibers. Melting processing thermoplastic resins containing chopped fiber under high shear conditions as in a conventional compound extruder can be used to disperse the fibers but normally severe fiber damage occurs. Considerable effort, therefore, has gone into developing methods for "opening up" the bundles (i.e., separating the bundles into individual fibers) and uniformly dispersing the fibers in the thermoplastic matrix with minimum damage to the fibers. Compositions produced by these processes are generally thought to be better reinforced and are more uniform in appearance.

As will be seen from the following Example, the compositions of this invention surprisingly exhibit better impact properties when processed under conditions which result in less-than-uniform fiber dispersion.

EXAMPLE 31

A composition containing 65 parts SAN, 20 parts ¼" glass fiber and 15 parts SAN-IBMA functional copolymer (10% IBMA) was prepared as in Example 14 by dry-blending the glass fiber and powdered resins in a PK blender for five minutes. The fiber-resin blend was injection molded on a 1 oz. Battenfeld screw injection molding machine having a 2.5:1 compression ratio and at a stock temperature of 430° F., and using controlled back pressures in the range 0–600 psi, to provide test specimens. The variation of impact properties and fiber dispersion with molding back pressure is summarized in Table IV, below.

A control composition, Control E, containing 80 parts SAN resin and 20 parts ¼" glass fiber was prepared and molded in substantially the same way to provide test specimens for comparison purposes.

TABLE IV

Effect of Molding Conditions on Izod Impact Properties

| | Example: | | |
|---|---|---|---|
| Back Pressure | 31 Impact[1] | Control E Impact[1] | Dispersion[2] |
| 600 psi | 0.7 | 0.9 | uniform |
| 300 psi | 1.4 | 0.9 | well-dispersed |
| 100 psi | 2.4 | 0.9 | fiber clumps |
| 0–50 psi[3] | 3.3 | 0.9 | discrete bundles |

Notes:
[1] Izod impact, ft./lb./in. notch, ⅛" bars, r.t.
[2] visual evaluation
[3] as measured; controlled at 50 psi As will be seen from the data in Table IV, increasing the back pressure improves the fiber dispersion, but Izod impact values are sharply decreased. At the lowest control pressure, 50 psi, the fiber glass bundles were not opened up or fully separated into individual fibers. The molded specimen was visually non-uniform and contained clumps of glass fiber distributed throughout. As is well known, increasing back pressure results in lowered resin through-put and in increased shear mixing which acts to improve fiber dispersion but also results in greater fiber breakage. As expected, fiber dispersion improves with increased back pressure, giving a visually uniform dispersion of fiber in the matrix resin at the highest back pressure (600 psi). Surprisingly, for the composition of this invention, Example 31, the low back pressure produced moldings having poor fiber dispersion which exhibited very much greater impact properties. The Control E example, which does not contain functional copolymer according to the teaching of this invention, exhibited substantially equivalent impact at all degrees of fiber dispersion. The effective back pressure range for good impact properties will be seen to lie in the range of from 0 to about 100 psi, and preferrably from about 0 to about 50 psi.

The improved method of this invention thus permits attaining high impact properties in glass-filled monovinylidene resins without requiring process steps designed to maximum dispersion of the fiber in the matrix resin. The minimal shear conditions employed in this process permit reprocessing of the glass-filled resin without loss in impact properties and thus allows the re-use of scrap, a desirable and economically advantageous result. Although the principles of this process will be applicable to most thermal processing methods commonly employed with glass-filled thermoplastic resins, the greatest advantages will lie in use with screw-fed means for melt processing resins such as for example screw-fed injection molding machines and machines for melt extrusing resins such as those used in the production of extruded sheet and profile. The use of low back pressures has the further advantage of allowing more rapid through-put of resin thus increasing production rates.

The invention will thus be seen to be an improved glass fiber reinforced thermoplastic resin composition comprising a thermoplastic monovinylidene resin, glass fiber, and a functional copolymer of at least one ethylenically unsaturated monomer and a copolymerizable functional monomer, and a method for enhancing the impact and ductility characteristics of glass fiber reinforced thermoplastic resins.

We claim:
1. A composition comprising:
(a) from 95 to 50 wt. % of a blend of a rigid thermoplastic monovinylidene resin selected from the group consisting of styrenic resins and acrylic resins; and a copolymer of at least one monovinylidene monomer selected from the group consisting of monovinyl aromatic compounds, acrylic compounds, and methacrylic compounds and from 1 to 20 wt. % of at least one ethylenically-unsaturated monomer containing at least one functional radical selected from the group consisting of carbonyl radicals and epoxy radicals; and (b) from 5 to 50 wt. % of a glass reinforcing fiber.

2. The composition of claim 1 wherein said carbonyl radicals are selected from the group consisting of carboxylic acid, carboxylic anhydride and amide.

3. A composition comprising:

(a) from 95 to 50 wt. % of a blend of a rigid thermoplastic monovinylidene resin selected from the group consisting of styrenic resins and acrylic resins;

a copolymer of at least one monovinylidene monomer selected from the group consisting of monovinyl aromatic compounds, acrylic compounds and methacrylic compounds and from 1 to 20 wt. % of a monomer selected from the group consisting of maleic anhydride, glycidyl methacrylate and N-alkoxymethyl acrylamide; and (b) from 5 to 50 wt. % of a glass reinforcing fiber.

4. The composition of claim 3 wherein the monovinylidene resin is a styrenic resin selected from the group consisting of polystyrene, styrene-acrylonitrile copolymers, styrene-alpha methylstyrene-acrylonitrile copolymers, styrene-methyl methacrylate copolymers, styrene-maleic anhydride copolymers, and high impact polystyrene.

5. The composition of claim 3 wherein said monovinylidene resin is polymethyl methacrylate.

6. The composition of claim 3 further comprising a non-styrenic thermoplastic resin.

7. The composition of claim 3 further comprising polyphenylene ether.

8. In a blend composition comprising from 95 to 50 wt %. of a rigid thermoplastic monovinylidene resin selected from the group consisting of styrenic resins and acrylic resins and correspondingly from 5 to 50 wt %. of a glass reinforcing fiber, the improvement wherein said blend composition further comprises a copolymer of from 99 to 80 parts by weight of at least one monovinylidene monomer selected from the group consisting of monovinylaromatic compounds, acrylic compounds and methacrylic compounds and correspodingly from 1 to 20 parts by weight of a monomer selected from the group consisting of maleic anhydride, glycidyl methacrylate and N-alkoxymethyl acrylamide, said monovinylidene resin and said copolymer being present in a weight ratio of from about 4.33 to about 1/1.

* * * * *